(12) United States Patent
Mies (10) Patent No.: US 8,959,986 B2
(45) Date of Patent: Feb. 24, 2015

(54) APPARATUS HAVING A ROUGHNESS MEASUREMENT SENSOR AND CORRESPONDING METHODS

(75) Inventor: Georg Mies, Wipperfurth (DE)

(73) Assignee: Klingelnberg AG, Zurich (CH)

( * ) Notice: Subject to any disclaimer, the term of this patent is extended or adjusted under 35 U.S.C. 154(b) by 711 days.

(21) Appl. No.: 13/163,128

(22) Filed: Jun. 17, 2011

(65) Prior Publication Data

US 2011/0277543 A1      Nov. 17, 2011

Related U.S. Application Data

(63) Continuation of application No. PCT/EP2009/066323, filed on Dec. 3, 2009.

(30) Foreign Application Priority Data

Dec. 19, 2008   (EP) .................................. 08172410

(51) Int. Cl.
    *G01B 5/28*      (2006.01)
(52) U.S. Cl.
    CPC .................................. *G01B 5/28* (2013.01)
    USPC .......................................................... 73/105
(58) Field of Classification Search
    CPC .................................. G01B 5/28; G01B 21/30
    USPC ..................................................... 73/104, 105
    See application file for complete search history.

(56) References Cited

U.S. PATENT DOCUMENTS

| | | | | |
|---|---|---|---|---|
| 2,345,622 A | * | 4/1944 | Mothwurf | 264/195 |
| 2,363,691 A | | 11/1944 | Reason | |
| 2,404,143 A | * | 7/1946 | Reason | 73/105 |
| 2,460,726 A | * | 2/1949 | Arndt, Jr. | 73/105 |
| 2,471,009 A | * | 5/1949 | Reason | 73/105 |
| 2,772,565 A | * | 12/1956 | Brown, Jr. et al. | 73/105 |
| 2,789,429 A | * | 4/1957 | Bidwell | 73/105 |
| 3,283,568 A | * | 11/1966 | Reason | 73/105 |
| 3,750,295 A | | 8/1973 | Nordmann et al. | |
| 4,552,014 A | * | 11/1985 | Berchtold | 73/105 |

(Continued)

FOREIGN PATENT DOCUMENTS

| | | |
|---|---|---|
| DE | 195 01 178 A1 | 6/1995 |
| DE | 197 21 015 C1 | 3/1999 |

(Continued)

OTHER PUBLICATIONS

European Search Report from European Patent Application No. EP 08 17 2410, dated Apr. 29, 2009.

(Continued)

*Primary Examiner* — Daniel S Larkin
(74) *Attorney, Agent, or Firm* — McCarter & English, LLP (57) ABSTRACT

An apparatus having a roughness sensing system and a roughness measurement sensor, wherein a slide element and a probe tip come to operation, and method of use thereof. The slide element is arranged on an extreme end of a probe pin in the form of a scan-slide element. The probe tip is integrated into the probe pin, and the distance between the scan-slide element and the probe tip is predetermined. The roughness sensing system is a 1D-, 2D- or 3D-scanning system having a parallelogram configuration. The apparatus further has a serving device which enables moving the probe pin together with the scan-slide element and the probe tip jointly over a surface to be scanned.

15 Claims, 5 Drawing Sheets

(56) References Cited

U.S. PATENT DOCUMENTS

| | | | |
|---|---|---|---|
| 4,597,519 A | 7/1986 | Kurtz et al. | |
| 4,765,181 A * | 8/1988 | Numoto et al. | 73/105 |
| 5,003,522 A | 3/1991 | Dolby | |
| 5,705,741 A * | 1/1998 | Eaton et al. | 73/105 |
| 5,740,616 A | 4/1998 | Seddon et al. | |
| 6,079,255 A * | 6/2000 | Binnig et al. | 73/105 |
| 6,397,667 B1 * | 6/2002 | Fujii et al. | 73/105 |
| 6,425,285 B1 * | 7/2002 | Fujii et al. | 73/104 |
| 6,446,496 B1 * | 9/2002 | Fujii et al. | 73/105 |
| 6,487,897 B1 * | 12/2002 | Fujii et al. | 73/105 |
| 2005/0015005 A1 | 1/2005 | Kockro | |
| 2007/0228592 A1 | 10/2007 | Dunn et al. | |

FOREIGN PATENT DOCUMENTS

| | | |
|---|---|---|
| DE | 100 54 112 A1 | 6/2001 |
| DE | 698 16 771 T2 | 3/2004 |
| EP | 1 589 317 A | 10/2005 |
| GB | 577 139 A | 5/1946 |

OTHER PUBLICATIONS

International Preliminary Report on Patentability for International Application No. PCT/EP2009/066323, mailed May 30, 2012.

Volk, Raimund, "Rauheitsmessung: Theorie and Praxis", 2005, pp. 39, 67-74 and 80-86, Beuth Verlag GmbH, Berlin.

International Search Report and Written Opinion of the International Searching Authority for International Application No. PCT/EP2009/066323, mailed Feb. 23, 2012.

* cited by examiner

Prior art

Fig. 1A

Prior art

Fig. 1B

Prior art

Fig. 2A

Prior art

Fig. 7

APPARATUS HAVING A ROUGHNESS MEASUREMENT SENSOR AND CORRESPONDING METHODS

CROSS-REFERENCE TO RELATED APPLICATIONS

This application is a continuation of International Patent Application No. PCT/EP2009/066323, filed Dec. 3, 2009, designating the United States, and claims priority under 35 U.S.C. §119(a)-(d) to European Patent Application No. EP 08172410.6, filed Dec. 19, 2008, the contents of both of which are hereby incorporated by reference in their entirety as part of the present disclosure.

FIELD OF THE INVENTION

The invention relates to apparatuses comprising roughness measurement sensors, and corresponding methods.

BACKGROUND OF THE INVENTION

In many technical areas, the surface structure of a constructional element or a material is an important quality characteristic.

There are different roughness measurement devices for rapidly collecting the roughness and/or scallop height of surfaces. Typically, during a mechanical scanning, a probe tip is guided over the surface. The result is a height signal recorded over the scanning path, the so-called surface profile.

Figure 1A:
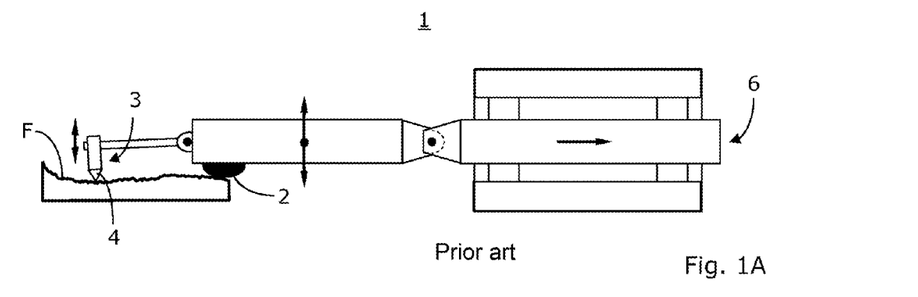
FIG. 1A is a schematic elevational view of a runner measurement device of the prior art.
Figure 1B:
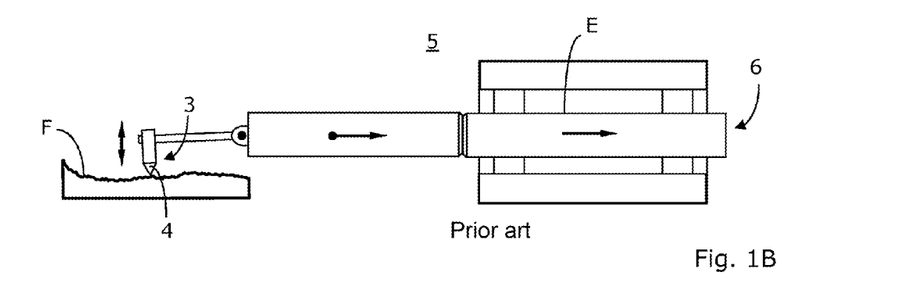
FIG. 1B is a schematic elevational view of a reference plane measurement device of the prior art.

A distinction is made between so-called runner sensors 1 and reference plane sensors 5, as shown in schematic form in FIGS. 1A and 1B. A runner sensor 1 has a runner 2 that has a large or small radius according to the area of application and that serves as a slide element. The scanner 3 of the runner sensor 1 bears on the surface F to be measured with the runner 2 and collects the surface profile relative to the path of the runner 2 using a probe tip 4 of the scanner 3. During the measurement, this runner 2 follows the macroscopic unevenness of the surface F, hence the waviness and macroscopic shape. On the other hand, the probe tip 4 collects, with its small tip radius, the surface roughness and senses the shape of grooves that are bridged by the runner 2, because the latter has a far larger effective radius. Thus, the runner 2 acts as a sort of high pass filter.

In order to better collect the waviness of a surface F, there are also runner sensors having two runners.

A reference plane sensor 5 stands out due to the fact that it is fixedly connected with a reference plane E. This reference plane E mostly resides in the heading part 6 of the scanner 3. A measurement with a reference plane sensor 5 yields, in comparison to a runner sensor 1, more precise and more comprehensive measurement results, in which besides the surface roughness the shape and the waviness of the constructional element can also be collected.

A runner sensor 1 is used, for example, in cases where no exact conclusions on the waviness or the 3-dimensional shape are desired. An advantage of a runner sensor 1 is the simple manageability, because measurements can be performed quickly and without significant alignments.

Figure 2A:
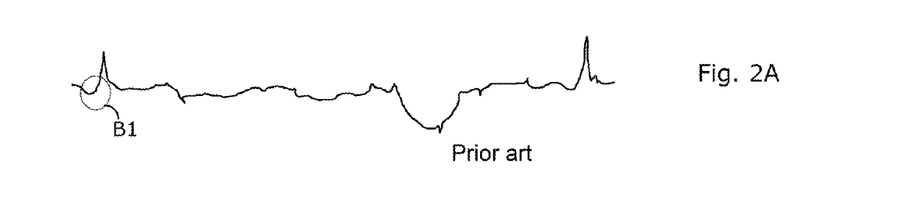
FIG. 2A is a schematic curve graphically depicting data that has been collected by the runner measurement device according to FIG. 1A.
Figure 2B:
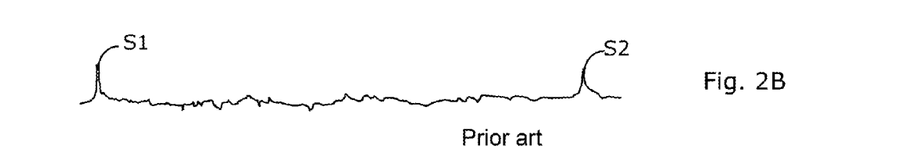
FIG. 2B is a schematic (reference) curve graphically depicting data that has been collected by the reference plane measurement device according to FIG. 1B.

In FIGS. 2A and 2B the scanning results of a runner sensor 1 (FIG. 2A) and a reference plane sensor 5 (FIG. 2B) are shown. The scanning result shown in FIG. 2B corresponds best to the reality, because a reference plane sensor 5 records the true course of the surface as far as possible unaltered. In particular, in the case of deep grooves or of isolated high peaks S1 and S2 (see FIG. 2B), the errors of the different runner sensors become noticeable. For example, the behavior in front of a peak S1 is characteristic for a runner sensor 1. The runner 2 reaches the peak S1 before the probe tip 4. Thereby, the whole scanner 3 is lifted and the probe pin 4 then projects further downward from the surrounding scanner casing. This is recorded in FIG. 2A in such a way (see range B1) as if the probe pin 4 would run apparently into a hollow of the surface F before reaching the peak S1. The same holds analogously when reaching the peak S2.

However, a runner sensor may also yield falsified results in other situations. For example, this is the case when the movement of the runner 2 superimposes constructively with the movement of the probe tip 4 and thus a too large output signal is provided, or when the movements extinguish themselves wholly or partially and thereby a too small signal is provided. These problems occur for example for periodic surfaces. Further details regarding the previously known roughness sensing systems can be taken for example from the following non-fiction book: "Rauheitsmessung: Theorie und Praxis" (English translation: "Roughness Measurement: Theory and Praxis"), by Raimund Volk, published by Beuth Verlag, 2005, ISBN 3410159185, 9783410159186.

For 3-dimensional constructional elements, it is often important to draw a conclusion on the local coincidence, which means, that for different constructional elements of a series the roughness has to be measured respectively at exactly the same position.

Beside the determination of the roughness, often the detection of the 3-dimensional shape, i.e., for example, the curvature of a surface (e.g., the convexity of a tooth of a gear wheel) or even the determination of the geometry, is also concerned.

SUMMARY OF THE INVENTION

It is an object of the invention to provide a measurement apparatus comprising a suitable measurement scanner, which apparatus enables one to conduct improved roughness measurements.

It is a further object of the invention to conduct roughness measurements at exactly predetermined positions of identical constructional elements.

It is a further object of the invention to allow manual exchange of the roughness measurement sensor in a manner that is as simple as possible.

It is a further object to design a measurement apparatus comprising a device having a demountable measurement scanner in such a way that it is not necessary to perform a new calibration after each exchange. In addition, damaging the scanning system shall be avoided.

In one aspect, an apparatus comprises a roughness sensing system and a roughness measurement sensor, wherein a slide element and a probe tip come to operation. The slide element is arranged at an external end of a probe pin in the form of a scan-slide element. The probe tip is integrated in the probe pin, wherein the distance between the scan-slide element and the probe tip is predetermined. The roughness sensing system concerns a 1D-, 2D- or 3D-scanning system having a parallelogram configuration. The apparatus further comprises a serving device that enables movement of the probe pin together with the scan-slide element and the probe tip jointly over a surface to be scanned.

In another aspect, a method for scanning a surface includes the following steps. A probe pin is advanced, which pin has a scan-slide element at an external end thereof and that comprises a probe tip at a distance to the scan-slide element. During the advancing, the scan-slide element is brought into contact with a point of the surface. Then, the probe pin is moved along the surface in at least one coordinate direction, whereby the scan-slide element and the probe tip are moved jointly at the distance over the surface. At the same time, first output signals are collected by means of 1D-, 2D- or 3D-transducers that are associated with the scan-slide element. In addition, a second output signal of a transducer is collected, which transducer is associated with the probe tip. Then, the first output signals and the second output signal are set into relation with each other.

The invention may be used in connection with 1D-, 2D- and 3D-measurement apparatuses.

The shape of the scan-slide element need not necessarily be an ideal spherical shape. The scan-slide element may also have an oval or cylindrical shape or any other suitable shape having a large radius of curvature. The scan-slide element may also have different radii in the axial and radial direction.

In one embodiment, the roughness measurement sensor can be exchanged. In a further embodiment, alternatively or in addition, the roughness measurement sensor can be rotated about a longitudinal axis.

It is one of the advantages of the invention that the apparatus provides information about a surface, which is comparable or even better than the information provided by a reference plane sensor.

It is an advantage of the invention, that a deviation of the movement of the scan-slide element from the ideal straight line or from the ideal reference plane is collected completely. This is achieved by the collection of the deflections of the 1D-, 2D- or 3D-transducer. It is possible according to the invention to calculate and set into relation the deviation of the movement of the scan-slide element with a roughness curve (which is represented by the signal f3) that has been collected simultaneously by a probe tip in such a way, that an exactly straight reference system is yielded. Errors that are known from conventional runner sensors may therefore be excluded.

Other advantages and features of the invention become apparent from the other claims as well as from the following description of an exemplary embodiment of the invention, which shall be understood not to be limiting and which will be explained below with reference to the drawings.

DETAILED DESCRIPTION OF EMBODIMENTS OF THE INVENTION

In relation with the present description, terms are used that are conventional to pertinent publications and patents. It is noted however that the use of these terms are only for descriptive purposes and should not be construed as limiting. The inventive idea and the scope of the patent claims shall not be limited in their interpretation by the specific choice of the terms used in the specification. The invention can be adapted to other systems of terminology and/or technical fields. In other technical fields, the terms are to be used analogously.

The term roughness is used here to denominate the surface quality of a surface. The roughness is limited to microscopic dimensions, in the sense of particular points or local conditions. Herein, typically in relation with the roughness, structures, elements and features of a surface F are concerned that have a size in the range of nm to approximately 500 μm.

A shape (also termed evenness) is a 2- or 3-dimensional plane or a 3-dimensional object in space connected from plural planes. Herein in relation with the shape, typically structures and elements are concerned that have a size dimension in the range of 0.5 mm to approximately 10 mm.

A geometric shape (herein also termed geometry) is a contiguous 2- or 3-dimensional plane in space or a 3-dimensional object in space connected from several planes that can be defined exactly by mathematical means. Typically, herein in relation with the geometry, 3-dimensional constructional components or elements are concerned that have a size dimension in the range of a few cm to approximately 100 cm or even larger.

Herein, as a shape is understood, in particular the evenness, as the curvature of a surface or for example the convexity of teeth of a toothing, the course of steps or stairs, the flank line of teeth of a toothing, the slope of a plane and the like. In order to be able to evaluate or scan the shape, typically several measurement points are scanned along a line, curve or area. Therefore, in this respect macroscopic conditions are also concerned.

The roughness measurement may be executed with a higher resolution (i.e. with high spatial resolution) than the (measurement or) scanning of the shape.

Figure 3A:
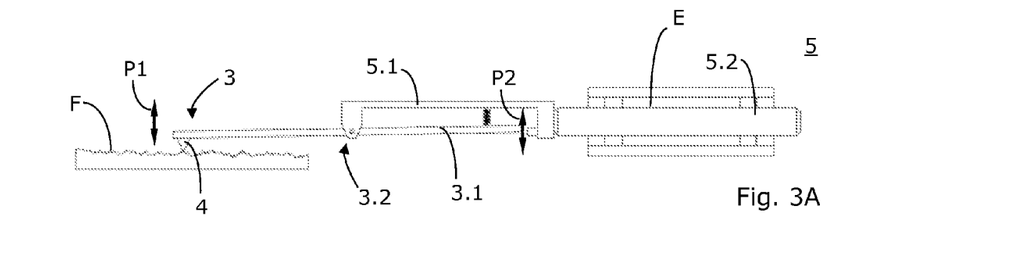
FIG. 3A is a schematic elevational view of a reference plane measurement device of the prior art.
Figure 3B:
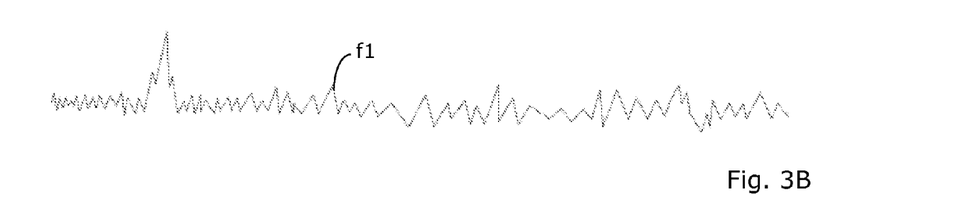
FIG. 3B is a schematic (reference) curve graphically depicting data that has been collected by the reference plane measurement device according to FIG. 3A.
Figure 4:
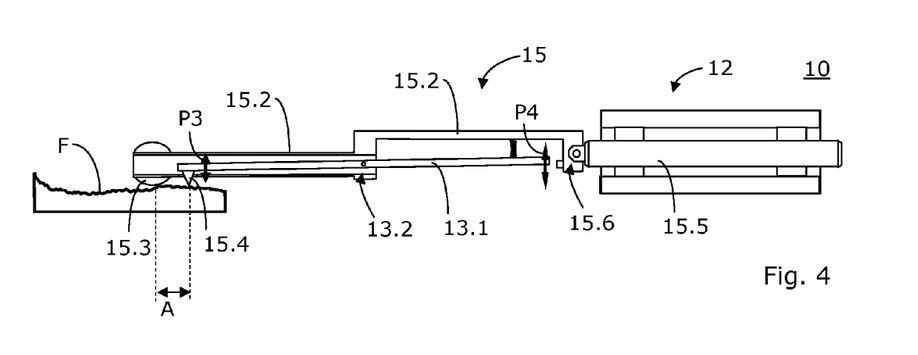
FIG. 4 is a schematic elevational view of a measurement apparatus in accordance with the present invention.

In FIGS. 3A and 4, a conventional reference plane sensor 5 and a measurement apparatus 10 according to the invention are opposed to each other in functional views. This is so the individual elements may be compared better. It can be seen in FIG. 3A that the front group of the scanner has a lever arm 3.1 that is supported by and rotatable about a pivot bearing 3.2. An extension spring 3.3 is provided at the end directed towards the rear of the lever arm 3.1. The elements 5.1 and 5.2 are fixedly connected with each other and thus define the reference plane E. An upward or downward movement of the probe tip 4 at the front end of the lever arm 3.1 (see the double arrow P1) produces a corresponding upward and downward movement (see the double arrow P2) at the rear end of the lever arm 3.1. This movement at the rear end of the lever arm 3.1 can be recorded by a transducer. From this, the results, for example, a signal f1, are shown in FIG. 3B as a function of a distance (for example the negative y-direction), this signal f1 corresponds as far as possible to the proper surface F. This course of the signal f1 is therefore assumed to be an image of the proper surface F.

According to FIG. 4, the apparatus 10 according to the invention includes a roughness measurement sensor 15, wherein a scan-slide element 15.3 and a probe tip 15.4 come into operation. Herein, the scan-slide element 15.3, which is arranged at an extreme end of a probe pin 15.2, serves as the slide element. The probe pin 15.2 may be formed as hollow or tubular, as indicated in FIG. 4. The probe tip 15.4 is integrated in the probe pin 15.2, wherein the distance A between the lowest point of the scan-slide element 15.3 and the probe tip 15.4 is predetermined. A lever arm 13.1, which is supported by and rotatable about a pivot bearing 13.2, is provided in the interior of the probe pin 15.2. At the end directed towards the rear side of the lever arm 13.1, an extension spring 13.3 is provided. An upward and downward movement of the probe tip 15.4 at the front end of the lever arm 13.1 (see the double arrow P3) produces a corresponding upward and downward movement (see the double arrow P4) at the rear end of the lever arm 13.1.

The probe pin 15.2 and an element 15.5 are movably connected with each other, as indicated by the hinge 15.6. In the measurement apparatus 10, this movable joint is realized by a (spring) parallelogram construction, which serves as a sprocket chain, as described further below. This parallelogram construction is part of a 1D-, 2D- or 3D-scanning system 12 (as shown, for example, in FIG. 6).

Figure 8A:
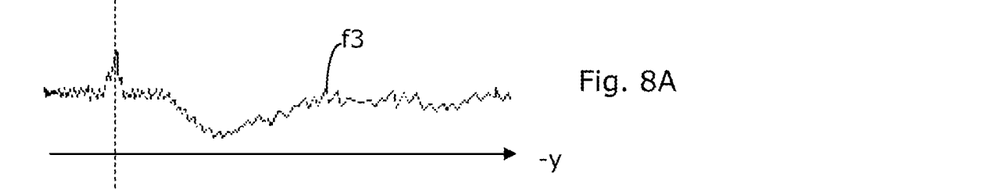
FIG. 8A is a schematic curve graphically depicting data that has been collected by the probe tip of a measurement apparatus of FIG. 4.
Figure 8B:
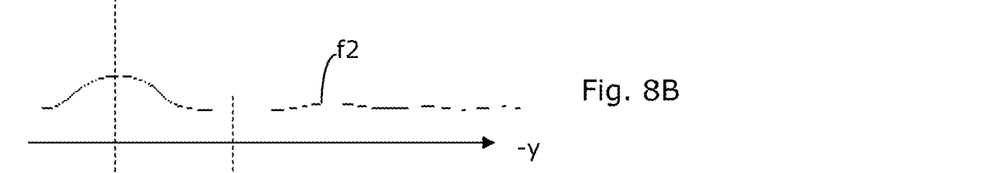
FIG. 8B is a schematic curve graphically depicting data that has been collected by the scan-slide element of the measurement apparatus of FIG. 4.

According to the invention, the probe pin 15.2 together with the scan-slide element 15.3 and the probe tip 15.4 is moved jointly over the surface F to be scanned. Thereby, both the scan-slide element 15.3, which is connected with the parallelogram construction via the probe pin 15.2, produce signals (herein termed signals f2), and also the probe tip 15.4, which is integrated in the probe pin 15.2, produces a signal (herein termed signal f3). An exemplary signal f3 is shown in FIG. 8A and an exemplary signal f2 is shown in FIG. 8B.

Figure 5:
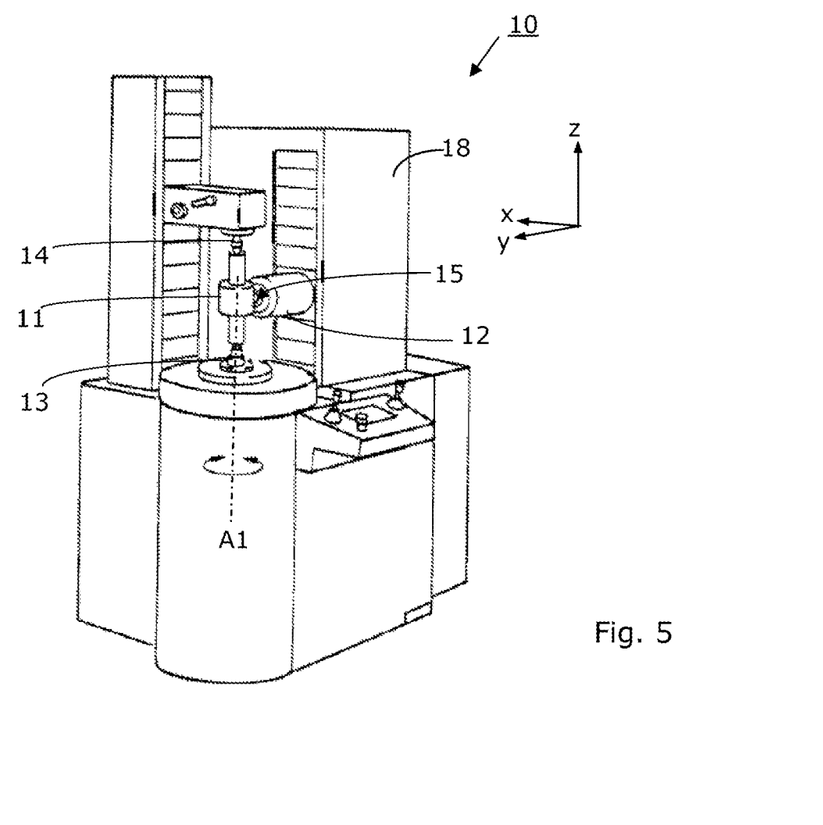
FIG. 5 is a perspective view of a computer numerical control (CNC) measurement device.

In an exemplary embodiment of the invention, which is shown in FIG. 5, a fully automated CNC controlled measurement apparatus 10 is illustrated. The measurement apparatus 10 is, for example, suitable for testing the surface roughness, shape or geometry of spur gear toothings, cutting and scraping wheels, worms and worm gears, hobs, baffle gears, and of general deviations in gauge, shape and position on rotationally symmetric constructional components, for curve- and camshaft-measurements or also for rotor measurements, just to mention a few options of use.

The measurement apparatus 10 comprises a drivable catch 13 (located behind the visible covering) and a centering means 14, wherein the catch 13 and the centering means 14 are arranged such that a constructional element 11 to be measured can be clamped coaxially between the catch 13 and the centering means 14, as shown in FIG. 5, shown with a stylized cylinder wheel 11.

The measurement apparatus 10 includes, as shown in FIG. 5, at least one transducer 15 for measuring, in three dimensions (three coordinate scanning system), the constructional element 11 clamped in the measurement apparatus 10. A scanning system 12 may be provided, which can be moved along its height, as indicated by the coordinate axis z in the x-y-z-coordinate system. In addition, the transducer 15 can execute further serving movements (e.g., a four axis path control may come into operation herein) as indicated by the coordinate axes, which are perpendicular to each other.

Figure 6:
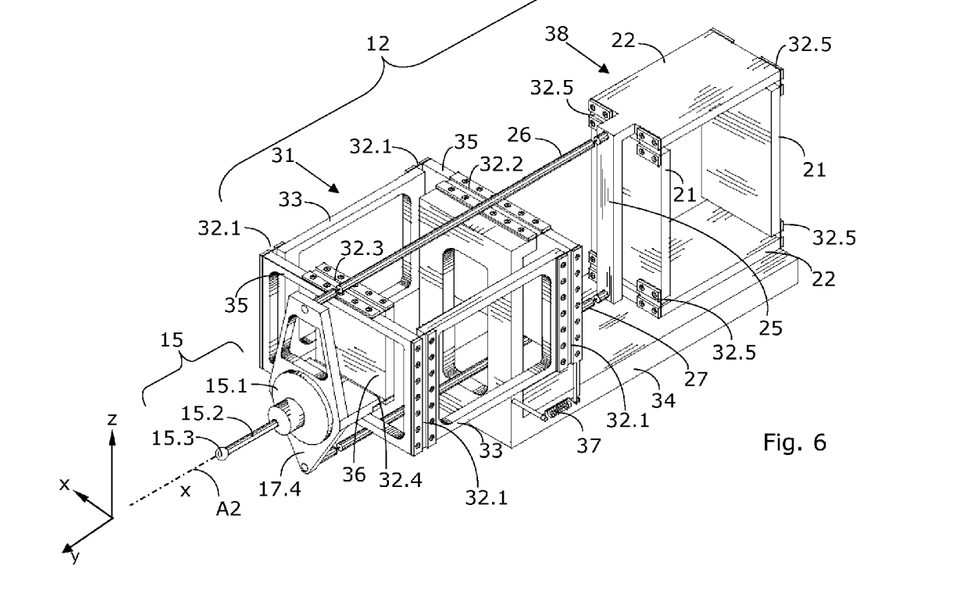
FIG. 6 is a semi-exploded schematic top perspective view of a three-coordinate-scanning head in accordance with the present invention and having a horizontal main axis.

In FIG. 6, there is shown a perspective view of a 3D-scanning system 12 of a measurement apparatus 10, which is constructed identically or similarly to the scanning system 12 shown in FIG. 5. Therefore, the same reference numerals are used for like elements. In the following, only the elements essential for a comprehension of the invention are explained. Further details on the measurement apparatus 10 can be taken, for example, from the patent DE 19721015, discussing a three-coordinate-scanning head, or from the patent publication DE 19501178, discussing a two-coordinate-scanning head), both of which are herein incorporated by reference in their entirety.

Shown in FIG. 6 is a scanning system 12 of a horizontal construction, which, as stated, is part of a numerically controlled measurement apparatus 10 and is provided with a deflectable probe pin 15.2 that is deflectable parallel to itself in multiple degrees of freedom. The probe pin 15.2 is hinged to a fixed scanning head base 34 via plural spring parallelogram systems 31, 38 that are functionally arranged perpendicular to each other. These spring parallelogram systems 31, 38 form the parallelogram construction, similar to that discussed above, on which the transducer 15 is supported. The deflections of the scan-slide element 15.3 together with the probe pin 15.2 are collected by two or three (1D-, 2D- or 3D-) transducers (not illustrated) connected to the scanning head base 34. These transducers provide the signals f2.

The scanning head illustrated in FIG. 6 has a roughness measurement sensor 15 and a scanning system 12. The scanning system 12 has an angular-shaped scanning head base 34 (in the form of a lying L), which is connected to a tower 18 (see FIG. 5) of the measurement apparatus 10. A first spring parallelogram 31 is movably suspended from a front part of the scanning head base 34, and includes, respectively, two elements 33 and 35, which are arranged pairwise and of equal length and which are connected mutually with each other by four spring hinges 32.1 having vertical axes (i.e., running parallel to the z-axis) and which enable the parallel shifting of the front element 35 in the x-direction. The suspension of the first spring parallelogram 31 is effectuated such that the whole spring parallelogram 31 is rotatable around the horizontal axis (i.e., an axis running parallel to the x-axis) of a further spring hinge 32.2. The spring parallelogram 31 may be stabilized by leaf springs (not illustrated). An adjustable tension spring 37 provides the required weight balance, so that the first spring parallelogram 31 takes a horizontal position in the x-y-plane for an undeflected scanning head. The tension spring 37 is shown only schematically in FIG. 6.

A connection element 36 is provided between the first spring parallelogram 31 and the probe pin carrier 17.4. It is movably connected to the probe pin carrier 17.4 using spring hinges 32.3 that are parallel to the spring hinge 32.2 at an upper edge of the element 35 and using a further spring hinge 32.4 that is parallel to the spring hinge 32.2 at the bottom side. By this connection element 36, the probe pin carrier 17.4 is however not yet sufficiently supported. To this end, still two double hinge rods 26 and 27 may be additionally attached to the probe pin carrier 17.4, which abut on a vertical bar 25. The vertical bar 25 belongs to a second spring parallelogram 38, which is formed by two respective pairwise arranged elements 21 and 22 of equal length, which are mutually connected by four spring hinges 32.5 having horizontal axes. This second spring parallelogram 38 is fixed to the lower element 22 on the scanning head base 34 such that parallel displacements of the upper element 22 in the y-direction are possible. The vertical bar 25 is fixed to this upper element 22. By this arrangement, it is assured that the probe pin carrier 17.4 is deflectable simultaneously in the x-, y- and z-directions and that thereby it displaces itself only in a direction parallel to the longitudinal axis A2. The two double hinge rods 26 27, the bar 25 and the scanning pin carrier 17.4 form a parallelogram for the movement in the z-direction. The torsional stiffness about the y-axis is achieved by the parallelogram 31 and the connection element 36 together with the two leaf springs arranged thereon.

It can be further seen in FIG. 6 that the probe pin 15.2 sits on a sort of (exchange-) disk 15.1. The disk 15.1 can be fixed to the probe pin carrier 17.4 of the scanning system 12. The fixation is effected, for example, by a lever arrangement that is not shown in FIG. 6. One such suitable lever arrangement is described in European patent application EP 1 589 317, filed on Apr. 23, 2004, titled: "Vorrichtung mit abnehmbarem Messtaster und Messgerat mit einer solchen Vorrichtung" (English translation: "Apparatus having a detachable measuring sensor and measurement device having such apparatus").

In an exemplary embodiment of the invention, the probe pin 15.2 is connected with the disk 15.1 such that the probe pin 15.2 can be rotated about its longitudinal axis A2. By the rotation around the longitudinal axis A2, the probe tip 15.4 can be directed in different directions. Thus, not only surfaces F in the x-y-plane, but other surfaces can also be scanned.

The parallelogram system described has the advantage that it forms a base that is torsionally stiff and has little friction for the measuring sensor 15. The dynamic behavior of the measurement sensor 15, when it is mounted to the scanning system 12, is sufficiently equal in all directions of deflection (e.g., coordinate directions). The parallelogram construction serves as a sprocket chain between the spatially movable measuring sensor 15 and the scanning head base 34. By the described way of arrangement of the individual elements of the scanning system 12 it is assured that the measurement sensor 15 is deflectable simultaneously in the x-, y- and z-direction and thereby displaces itself only parallel to itself.

Figure 7:
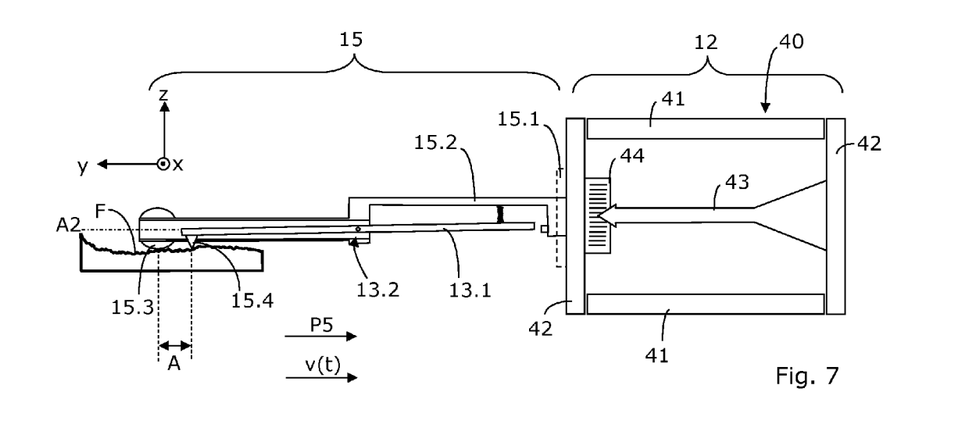
FIG. 7 is a schematic elevational view of a one-coordinate-scanning head including a roughness measurement sensor in accordance with the present invention.

Further details of a scanning head according to the invention can be seen in FIG. 7. The scanning head is constructed similar to the scanning head shown in FIG. 6. However, a 1D-scanning head is concerned here. Therefore, the same reference numerals are used for like elements. FIG. 7, however, contains a further detailed illustration. The measurement sensor 15 has a probe pin 15.2 having a scan-slide element 15.3. In this connection it should be noted, that the shape of the scan-slide element 15.3 need not necessarily be an ideal spherical shape. The scan-slide element 15.3 may also have an oval or cylindrical shape or another suitable shape having a large radius of curvature. The scan-slide element 15.3 serves, according to the invention, namely as a runner, analogously to a runner of the runner measurement device 1. The scan-slide element 15.3 is drawn or moved over a surface F to be scanned when measuring the roughness and has a sufficiently large radius of curvature. In one embodiment, the scan-slide element 15.3 has a radius in the axial direction (i.e., in the direction of A2) of 10 mm and a radius of 1 mm in the radial direction. Of course, a large radius is advantageous. Because the portion of the scan-slide element 15.3, which is effective as a runner, contains only a section from the radius, so as to achieve a small distance A to the probe tip 15.4, the radius is not chosen to be unnecessarily large, because otherwise there is a risk that the edge of this runner slides over the surface F. Thereby, errors occur because the edge has a very small radius.

The probe tip 15.4 may have a tip radius of a few micrometers (μm). Probe tips having a tip radius in the range of 2-10 μm may be used.

In addition to the scan-slide element, the measurement sensor 15 has an integrated probe tip 15.4, as previously described. This probe tip 15.4 is arranged at a small distance A behind (or beside) the lowest point of the scan-slide element 15.3. A distance A of 0 would be ideal. However, this cannot be realized for scan-slide elements 15.3 that are domed in two directions. For a spherical shaped scan-slide element 15.3 the provision of a bore for the reception of the probe tip 15.4 would not be meaningful, because then the edges of the bore would touch the surface F. In the example shown, the distance A is 1.5 mm. In general, the distance A may be between 1.5 and 5 mm for the embodiments according to the invention. This probe tip 15.4 is floatingly supported, as illustrated in FIG. 4, in order to be able to sense or measure structures, elements and features of the surface F that have a size in the range of nanometers (nm) to approximately 500 μm.

The probe tip 15.4 may also be integrated directly in the scan-slide element 15.3. However, this works only for scan-slide elements 15.3 that have a radius that is perpendicular to the movement direction. Such scan-slide elements 15.3 can be problematic, because the direction of the scan-slide element 15.3 that is not curved is best directed exactly parallel to the surface F.

The measurement sensor 5 is arranged on a parallelogram construction 40 as in the embodiment shown in FIG. 7. Optionally, the measurement sensor 15 may be connected to the spring parallelogram construction 40 via an (exchange-) disk 15.1 and/or the elements 17.4, 32.4, 36 and 32.3 as in FIG. 6. These elements and constructional parts are not shown in the schematic representation in FIG. 7. The optional (exchange-) disk 15.1 is shown dashed.

The parallelogram construction 40 comprises two parallel elements 41 and two additional parallel elements 42 standing perpendicular thereto. The rear element 42 may serve as a reference base. In this case, the rear element is connected, for example, with the tower 18 or with the scanning head base 34. An indicator element 43 or jib may be provided on the reference base. Now, if the scan-slide element 15.3 together with the probe pin 15.2 is deflected parallel to the z-direction, then the front element 42 shifts in the x-z-plane. This lateral movement in the x-z-plane expresses itself in a relative movement of the indicator element 43 or jib in relation to the 1D-transducer 44. This transducer 44 is represented as stylized in the form of a linear scale. The transducer 44 can thus provide a signal f2, which allows a conclusion on the shape of the surface F.

The measurement device 10 can guide the scan-slide element 15.3, for example, vertically and radially close to the constructional element 11 (e.g., to the cylinder wheel 11, see FIG. 5) to be tested, whereby the longitudinal axis A2 of the probe pin 15.2 has a horizontal position. Furthermore, the measurement device 10 can thereby turn or move the constructional element 11 until the scan-slide element 15.3 touches it at a pre-determinable surface F. In that way, for example, the curved tooth surface of the constructional element 11 can be touched at a starting point. To this end, the measurement sensor 15 can be served in the x-y-z-coordinate system by means of serving movements, and is deflectable, because of the special parallelogram construction, also in one, two or in all three coordinate directions x, y, z of the space, as described above.

Now, the scan-slide element 15.3 is moved over the surface F starting from the starting point to an end point. In FIG. 7, the scan-slide element 15.3 is drawn over this surface F in the direction indicated by the arrow P5. The probe tip 15.4 precedes when the scan-slide element 15.3 is drawn. In case the scan-slide element 15.3 is pushed over the surface, then the probe tip 15.4 follows.

The measurement device 10 according to the invention provides two output signals f2 and f3, which are set in relation with each other. The first output signal f2 originates from the scanning of the surface with the scan-slide element 15.3 as in the previously known 1D-, 2D- or 3D-measurement device. An exemplifying measurement signal f2 is shown in FIG. 8B. Here, a measurement signal f2 is concerned, which has been generated while the scan-slide element 15.3 has been drawn in the y-direction over the surface F. The second output signal f3 originates from the probe tip 15.4. Also, this measurement signal f3 has been generated while the probe tip 15.4 has been drawn over the surface F in the -y-direction. The first and the second output signals f2 and f3 are in relation with each other both spatially and also temporally.

With the measurement arrangement described, the measurement apparatus 10 according to the invention collects all deflections of the scan-slide element 15.3 along a straight line (during a 1D-measurement), in the x-z-plane (during a 2D-measurement) or in the space spanned by the three coordinate directions x, y and z (during a 3D-measurement). The deflections in the z-plane can be collected by a 1D-measurement apparatus, as represented for example in FIG. 7. The deflections in the 3- or 2-dimensional space are represented by the first output signal f2 (see FIG. 8B).

Figure 8C:
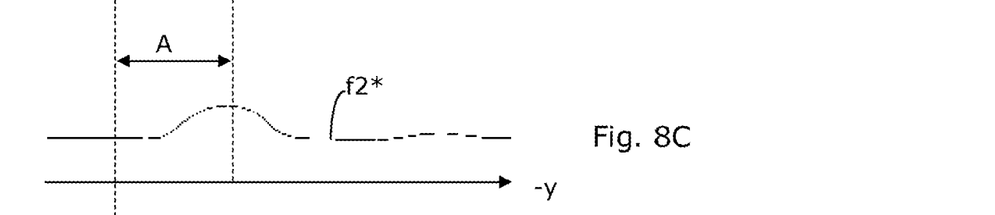
FIG. 8C is the curve of FIG. 8B shifted spatially by the distance A.
Figure 8D:
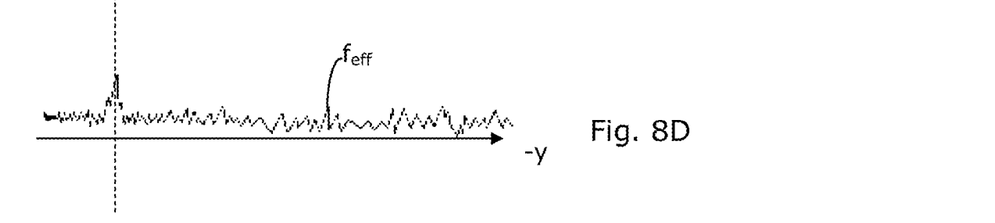
FIG. 8D is a superposition of the curves of FIG. 8A and of FIG. 8C represented schematically.

In one embodiment of the invention, only the spatial relationship is used in order to relate the two output signals f2 (see FIG. 8B) and f3 (see FIG. 8A) to each other. When the scan-slide element 15.3 is drawn along a straight line parallel to the negative y-axis across the surface F to be scanned, then the output signal f3 of the probe tip 15.4 is linearly displaced exactly by the distance A between the scan-slide element 15.3 and the probe tip 15.4. A linear displacement of f2 produces a spatially shifted signal f2*, which is represented schematically in FIG. 8C. Then, the signals f2* and f3 can be superimposed as shown in FIG. 8D, e.g., by addition. The superimposition results in a signal $f_{\mathit{eff}}$ and can be effected by a simple addition $f_{\mathit{eff}}=f2^*+f3$. It is also possible to use other functions in the superimpositioning. Thus, for example the signal f3 may be weighted more strongly than the signal f2*.

In a further embodiment of the invention, both the spatial and the temporal relationship are used. The temporal relationship is derived from the fact that the scan-slide element 15.3 together with the probe tip 15.4 is guided over the surface F with a predetermined or known velocity v(t). Due to the inertia of the scan-slide element 15.3 and also the probe tip 15.4, somewhat different results can be achieved depending on the velocity v(t). This becomes apparent with the help of an example, wherein the moving velocity v(t) is so large that the scan-slide element 15.3 and/or the probe tip 15.4 jump over features of the surface F.

The measurement sensor 15 is extremely sensitive and during quick measurement it is important that the measurement sensor 15 does not collide with the constructional element 11 during the movement in the space spanned by the coordinate axes x, y and z or during the movement of the constructional element 11 around the axis A1. Also, it can be possible to employ a different measurement sensor 15, depending on the particular measurement protocol.

It is an advantage of the invention that the probe tip 15.4 is protected to some degree by the "pipe" 15.2 of the scanner. By the arrangement of the scanner 15 in a 3D-measurement sensor, its protection systems become effective to their full extent during collisions.

As previously noted, exchangeable measurement sensors 15 may be used. The exchange function may be integrated in the exchange disk 15.1.

Also, a 1D-, 2D- or 3D-measurement sensor 15 may be used in which the probe tip 15.4 can be retracted in case of non-use. To this effect, an electromagnet, which applies a magnetic attracting force on the inwardly directed side of the probe tip 15.4 or on the lever arm 13.1 when being switched on, may be mounted, for example, in the interior of the probe pin 15.2. Thus, the probe tip 15.4 can be retracted. It is then possible to perform, for example, conventional 1D-, 2D- or 3D-probing measurements with the scan-slide element 15.3 in order to then switch off the electromagnet and bring the probe tip 15.4 into operation as needed.

In a further embodiment of the invention, the probe tip 15.4 together with the lever arm 13.1 is arranged laterally beside the scan-slide element 15.3.

Further details on the exact functionality of the apparatus 10 can be taken from the patent specification of DE 19721015 titled: "Universeller Tastkopf für Verzahnungsmessungen" (English translation: "Universal probe head for toothing measurements"), which is herein incorporated by reference in its entirety.

As should be recognized by those of ordinary skill in the pertinent art based on the teachings herein, numerous changes and modifications may be made to the above-described and other embodiments of the present invention without departing from its scope as defined in the appended claims. Accordingly, this detailed description of embodiments is to be taken in an illustrative, as opposed to a limiting, sense.

What is claimed is:

1. An apparatus, comprising:
   a roughness sensing system comprising a 1D-, 2D- or 3D-scanning system and having a parallelogram configuration;
   a roughness measurement sensor including a probe pin having a slide element comprising a scan-slide element located at an end of the probe pin and a probe tip integrated with the probe pin at a predetermined distance from the scan-slide element; and
   an advancing device adapted to jointly move the probe pin together with the scan-slide element and the probe tip over a surface to be scanned;
   wherein the roughness sensing system provides (a) a first signal that allows a conclusion on the shape or geometry of a scanned surface, and (b) a second signal that allows a conclusion on the roughness of said scanned surface;
   said apparatus being further configured to at least one of spatially and temporally correlate the signals to align the signals at least one of spatially or temporally.

2. An apparatus as defined in claim 1, wherein:
   the first signal is collectible by application of the scan-slide element to the surface to be scanned; and
   the second signal is collectible by application of the probe tip to the surface to be scanned.

3. An apparatus as defined in claim 1, wherein the first signal and the second signal are correlated, so as to be able to provide information regarding said scanned surface.

4. An apparatus as defined in claim 1, wherein:
   the roughness measurement sensor is deflectable in a plurality of degrees of freedom; and
   the roughness sensing system generates at least one signal that represents information about a deflection of the roughness measurement sensor.

5. An apparatus as defined in claim 1, wherein the probe pin, the scan-slide element and the probe tip are rotatably supported about a longitudinal axis of the probe pin.

6. An apparatus as defined in claim 1, wherein the probe pin is at least partially hollow and configured to receive a lever arm in its interior and the probe tip is located at one end of the lever arm.

7. A method for scanning a surface, comprising:
    moving a probe pin comprising a scan-slide element at an extreme end thereof and a probe tip located at a distance from the scan-slide element, so as to bring the scan-slide element into contact with a point of the surface;
    jointly moving the probe pin and the scan-side element along the surface in at least one coordinate direction;
    collecting at least one first output signal of a 1D-, 2D- or 3D-transducer operatively connected to the scan-slide element;
    collecting a second output signal of a transducer operatively connected to the probe tip; and
    at least one of spatially and temporally correlating the signals to align the signals at least one of spatially or temporally.

8. A method as defined in claim 7, wherein the correlating step comprises shifting one of the at least one first output signal and the second output signal spatially by the distance.

9. A method as defined in claim 8, wherein the at least one first signal allows a determination of the shape or geometry of the surface, and the second signal allows a determination on the roughness of the surface.

10. A method as defined in claim 8, wherein the moving step further comprises rotating the probe pin about a longitudinal axis thereof.

11. A method as defined in claim 7, wherein the correlating step comprises shifting one of the at least one first output signal and the second output signal temporally.

12. A method as defined in claim 11, wherein the at least one first signal allows a determination of the shape or geometry of the surface, and the second signal allows a determination on the roughness of the surface.

13. A method as defined in claim 11, wherein the moving step further comprises rotating the probe pin about a longitudinal axis thereof.

14. A method as defined in claim 7, wherein the at least one first signal allows a determination of the shape or geometry of the surface, and the second signal allows a determination on the roughness of the surface.

15. A method as defined in claim 7, wherein the moving step further comprises rotating the probe pin about a longitudinal axis thereof.

* * * * *